(12) United States Patent
Tsai et al.

(10) Patent No.: US 8,743,336 B2
(45) Date of Patent: Jun. 3, 2014

(54) COLOR FILTER SUBSTRATE AND DISPLAY PANEL

(71) Applicant: Chunghwa Picture Tubes, Ltd., Taoyuan (TW)

(72) Inventors: Chun-Hsien Tsai, Taoyuan County (TW); Chuang-Feng Wu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 80 days.

(21) Appl. No.: 13/658,829

(22) Filed: Oct. 24, 2012

(65) Prior Publication Data

US 2014/0063420 A1    Mar. 6, 2014

(30) Foreign Application Priority Data

Aug. 30, 2012  (TW) .............................. 101131584 A

(51) Int. Cl.
G02F 1/1339 (2006.01)
(52) U.S. Cl.
USPC .......................................................... 349/156
(58) Field of Classification Search
CPC ................... G02F 1/13394; G02F 2001/13396
USPC ........................................................ 349/156
See application file for complete search history.

(56) References Cited

U.S. PATENT DOCUMENTS

| 6,493,050 | B1 * | 12/2002 | Lien et al. | 349/106 |
| 6,958,792 | B2 * | 10/2005 | Lan et al. | 349/110 |
| 7,633,595 | B2 * | 12/2009 | Kim et al. | 349/156 |

FOREIGN PATENT DOCUMENTS

| TW | I241433 | 10/2005 |
| TW | I359973 | 3/2012 |

* cited by examiner

*Primary Examiner* — James Dudek
(74) *Attorney, Agent, or Firm* — Jianq Chyun IP Office

(57) ABSTRACT

A color filter substrate includes a substrate, a light-shielding layer, a color filter layer, at least one padding structure, a passivation layer, a transparent conductive layer and at least one spacer. The substrate has a light-shielding region and pixel regions. The light-shielding layer is located in the light-shielding region. The color filter layer is located in the pixel regions. The padding structure disposed on the light-shielding layer and the color filter layer are in the same layer. The passivation layer covers the padding structure, a portion of the light-shielding layer and the color filter layer. The spacer is disposed on the transparent conductive layer which covers the passivation layer and located above the color filter layer. A height of the spacer and a thickness of the color filter layer in total are less than a height of the padding structure and a thickness of the light-shielding layer in total.

10 Claims, 2 Drawing Sheets

COLOR FILTER SUBSTRATE AND DISPLAY PANEL

CROSS-REFERENCE TO RELATED APPLICATION

This application claims the priority benefit of Taiwan application serial no. 101131584, filed on Aug. 30, 2012. The entirety of the above-mentioned patent application is hereby incorporated by reference herein and made a part of this specification.

BACKGROUND OF THE INVENTION

1. Field of the Invention

The invention relates to a substrate and a display apparatus, and more particularly, to a color filter substrate and a display panel.

2. Description of Related Art

Liquid crystal display (LCD) panels have advantages of thin thickness, high definition, low power consumption, and no radiation, and thus have become the mainstream of flat display apparatuses. Generally, an LCD panel is constituted by a thin film transistor (TFT) array substrate, a color filter substrate and a liquid crystal layer. Here, a silver paste is formed on the color filter substrate before assembly of the TFT array substrate and the color filter substrate. When the TFT array substrate and the color filter substrate are aligned and assembled together, the color filter substrate is electrically connected to an electrode on the TFT array substrate via the silver paste or a conductive spacer, thereby completing an electrical connection between the TFT array substrate and the color filter substrate. However, a conventional silver paste is in a colloid form in its initial state and is disposed onto the color filter substrate through a dispensing process, and thus can be shaped only after being pressed and roasted. Thus, the conventional silver paste requires more complicated fabrication processes and a process yield thereof is not good.

SUMMARY OF THE INVENTION

The invention provides a color filter substrate which reduces the problems of complicated process and low process yield existing in the prior art.

The invention provides a display panel having the aforementioned color filter substrate, which effectively simplifies the fabrication process and improves the process yield.

The invention proposes a color filter substrate including a substrate, a light-shielding layer, a color filter layer, at least one padding structure, a passivation layer, a transparent conductive layer and at least one spacer. The substrate has a light-shielding region and a plurality of pixel regions. The light-shielding layer is disposed on the substrate and located in the light-shielding region. The color filter layer is disposed on the substrate and located in the pixel regions. The padding structure is disposed on the light-shielding layer, wherein the padding structure and the color filter layer are in the same layer. The passivation layer covers the padding structure, a portion of the light-shielding layer and the color filter layer. The transparent conductive layer covers the passivation layer. The spacer is disposed on the transparent conductive layer and located above the color filter layer, wherein a height of the spacer and a thickness of the color filter layer in total are less than a height of the padding structure and a thickness of the light-shielding layer in total.

In an embodiment of the invention, the color filter layer includes a plurality of color filter patterns, and the color filter patterns are located in the pixel regions.

In an embodiment of the invention, the color filter patterns include at least one red filter pattern, at least one blue filter pattern and at least one green filter pattern.

In an embodiment of the invention, the padding structure is formed by stacking at least two color filter patterns.

In an embodiment of the invention, the thickness of the light-shielding layer is less than the thickness of the color filter layer.

In an embodiment of the invention, the height of the padding structure is greater than the height of the spacer.

In an embodiment of the invention, the passivation layer has the same thickness on the padding structure, the light-shielding layer, and the color filter layer.

In an embodiment of the invention, the transparent conductive layer has the same thickness on the passivation layer.

The invention proposes a display panel including the color filter substrate, an active device array substrate and a display medium. The active device array substrate has a pixel electrode layer. The transparent conductive layer of the color filter substrate is connected to the pixel electrode layer of the active device array substrate via the padding structure. The display medium is located between the color filter substrate and the active device array substrate.

In an embodiment of the invention, the display medium includes a liquid crystal layer.

Based on the above, the padding structure and the color filter layer of the invention are in the same layer. Accordingly, compared to the conventional fabrication of silver paste layer, a design of the color filter substrate of the invention reduces the problems of complicated process and low process yield existing in the prior art. Thus, the fabrication process is simplified and the process yield is improved effectively. In addition, in the display panel employing the color filter substrate disclosed by the invention, the transparent conductive layer of the color filter substrate is connected to the pixel electrode layer of the active device array substrate via the padding structure, so as to achieve an effect of electrical conduction.

To make the aforementioned features and advantages of the invention more comprehensible, embodiments accompanied with figures are described in detail below.

DESCRIPTION OF EMBODIMENTS

Figure 1:
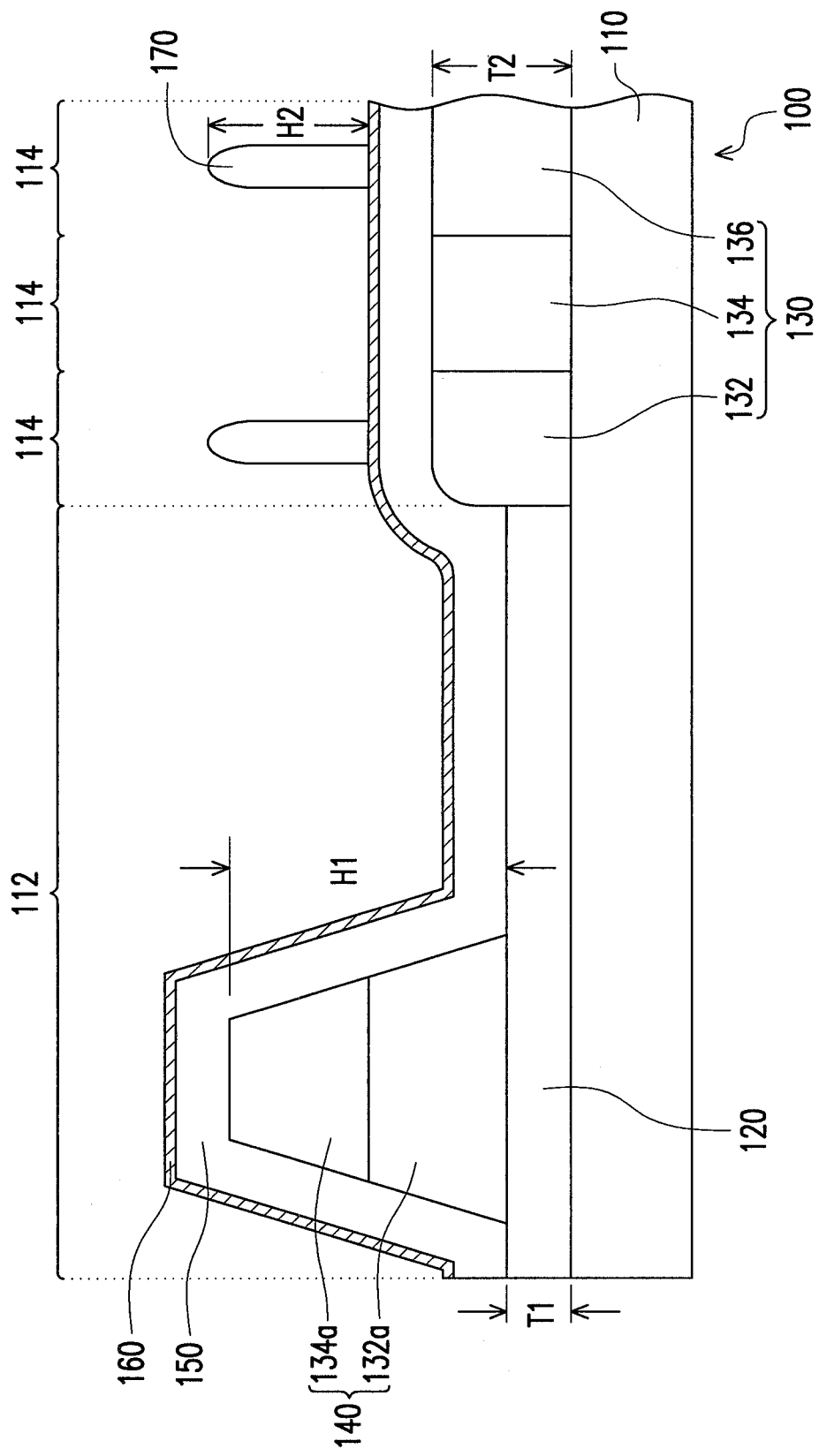
FIG. 1 illustrates a schematic partial cross-sectional view of a color filter substrate according to an embodiment of the invention.

FIG. 1 illustrates a schematic partial cross-sectional view of a color filter substrate according to an embodiment of the invention. Referring to FIG. 1, in the present embodiment, a color filter substrate 100 includes a substrate 110, a light-shielding layer 120, a color filter layer 130, at least one padding structure 140, a passivation layer 150, a transparent conductive layer 160 and at least one spacer 170.

Specifically, the substrate 110 has a light-shielding region 112 and a plurality of pixel regions 114, wherein the substrate 110 is, for example, a glass substrate. The light-shielding layer 120 is disposed on the substrate 110 and located in the light-shielding region 112. The color filter layer 130 is disposed on the substrate 110 and located in the pixel regions 114. The padding structure 140 is disposed on the light-shielding layer 120, wherein the padding structure 140 and the color filter layer 130 are in the same layer. The passivation layer 150 covers the padding structure 140, a portion of the light-shielding layer 120 and the color filter layer 130. The transparent conductive layer 160 covers the passivation layer 150. The spacer 170 is disposed on the transparent conductive layer 160 and located above the color filter layer 130. In particular, a height H2 of the spacer 170 and a thickness T2 of the color filter layer 130 in total are less than a height H1 of the padding structure 140 and a thickness T1 of the light-shielding layer 120 in total.

More specifically, the color filter layer 130 of the present embodiment includes a plurality of color filter patterns 132, 134 and 136 (only three color filter patterns are schematically illustrated in FIG. 1), and the color filter patterns 132, 134 and 136 are located in the pixel regions 114. Here, the color filter patterns 132, 134 and 136 are, for example, at least one red filter pattern, at least one blue filter pattern and at least one green filter pattern. However, the invention is not limited thereto. In particular, the padding structure 140 of the present embodiment is formed by stacking at least two color filter patterns 132a and 134a. During a fabrication process, at the same time when the color filter pattern 132 is formed in one of the pixel regions 114 of the substrate 110 via a mask (not illustrated), the color filter pattern 132a is formed in the light-shielding region 112 of the substrate 110. At this moment, the color filter pattern 132 and the color filter pattern 132a have the same materials and the same colors. Next, at the same time when the color filter pattern 134 is formed in another of the pixel regions 114 of the substrate 110 via another mask (not illustrated), the color filter pattern 134a is formed in the light-shielding region 112 of the substrate 110. At this moment, the color filter pattern 134a is stacked on the color filter pattern 132a, and the color filter pattern 134 and the color filter pattern 134a have the same materials and the same colors. Here, the height H1 of the padding structure 140 is greater than the height H2 of the spacer 170, and the thickness T1 of the light-shielding layer 120 is less than the thickness T2 of the color filter layer 130. In addition, the passivation layer 150 of the present embodiment has the same thickness on the padding structure 140, the light-shielding layer 120, and the color filter layer 130. The transparent conductive layer 160 has the same thickness on the passivation layer 150.

The padding structure 140 and the color filter layer 130 of the present embodiment are in the same layer. Accordingly, compared to the prior art where an additional process is required to fabricate a silver paste layer, the design of the color filter substrate 100 of the present embodiment makes it possible to complete fabrication of the color filter layer 130 and the padding structure 140 in the same process step, thus effectively reducing the problems of complicated process and low process yield existing in the prior art. As a result, the fabrication process is simplified and the process yield is improved effectively.

Figure 2:
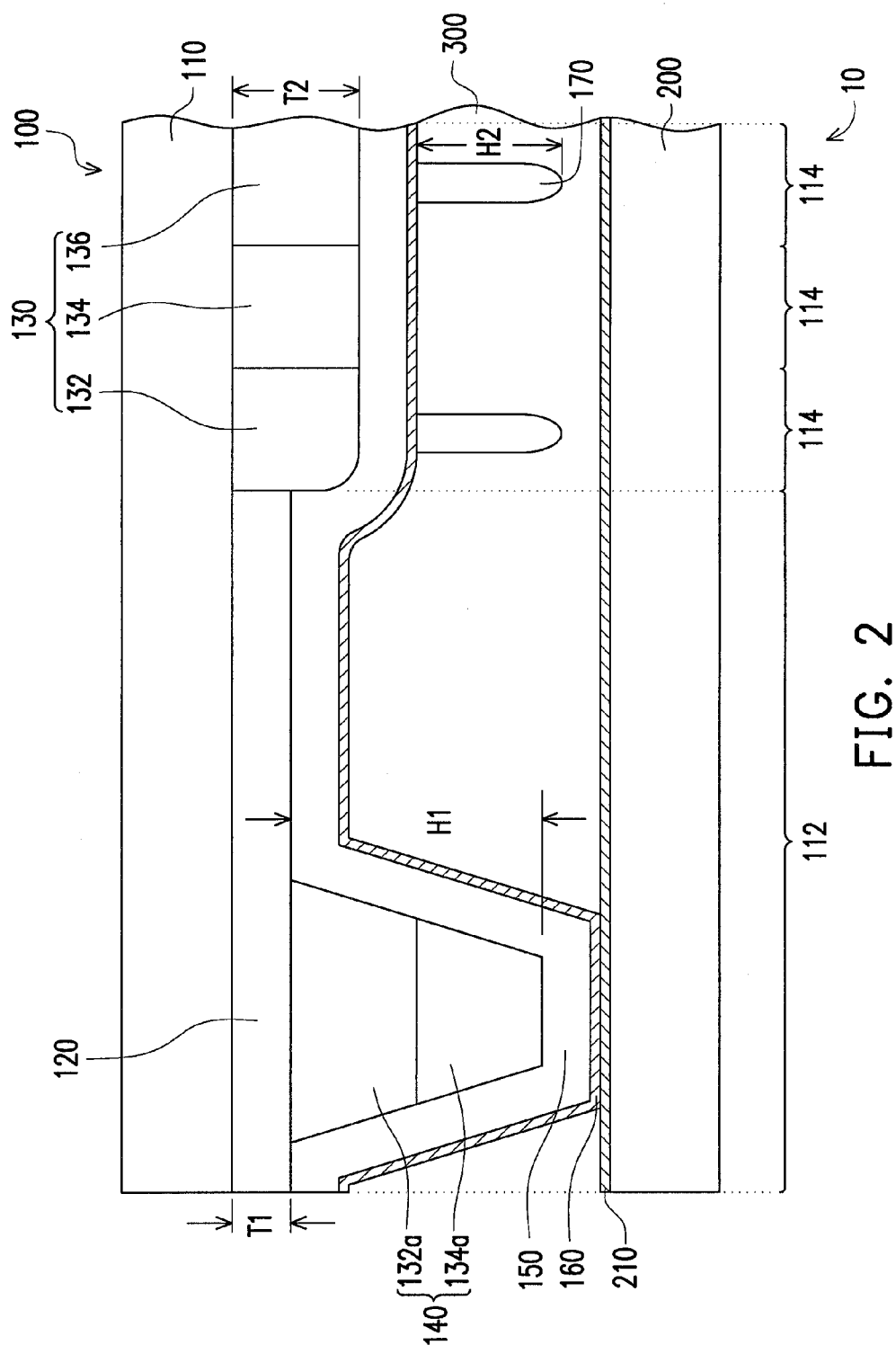
FIG. 2 illustrates a schematic partial cross-sectional view of a display panel according to an embodiment of the invention.

FIG. 2 illustrates a schematic partial cross-sectional view of a display panel according to an embodiment of the invention. Referring to FIG. 2, a display panel 10 of the present embodiment includes the color filter substrate 100, an active device array substrate 200 and a display medium 300, wherein the active device array substrate 200 has a pixel electrode layer 210, and the display medium 300 is located between the color filter substrate 100 and the active device array substrate 200. In particular, the transparent conductive layer 160 of the color filter substrate 100 is connected to the pixel electrode layer 210 of the active device array substrate 200 via the padding structure 140. In addition, here, the display medium 300 is, for example, a liquid crystal layer. The display panel 10 is, for example, a liquid crystal display panel.

Since the color filter substrate 100 of the present embodiment has the padding structure 140, when the color filter substrate 100 and the active device array substrate 200 are aligned and assembled together, the transparent conductive layer 160 of the color filter substrate 100 is connected to the pixel electrode layer 210 of the active device array substrate 200 via the padding structure 140, thus electrically connecting the color filter substrate 100 to the active device array substrate 200.

To sum up, the padding structure and the color filter layer of the invention are in the same layer. Accordingly, compared to the conventional fabrication of silver paste layer, the design of the color filter substrate of the invention reduces the problems of complicated process and low process yield existing in the prior art. The fabrication process is simplified and the process yield is improved effectively. In addition, in the display panel employing the color filter substrate disclosed by the invention, the transparent conductive layer of the color filter substrate is connected to the pixel electrode layer of the active device array substrate via the padding structure, so as to achieve an effect of electrical conduction.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A color filter substrate, comprising:
   a substrate having a light-shielding region and a plurality of pixel regions;
   a light-shielding layer disposed on the substrate and located in the light-shielding region;
   a color filter layer disposed on the substrate and located in the pixel regions;
   at least one padding structure disposed on the light-shielding layer, wherein the padding structure and the color filter layer are in the same layer;
   a passivation layer covering the padding structure, a portion of the light-shielding layer and the color filter layer;
   a transparent conductive layer covering the passivation layer; and
   at least one spacer disposed on the transparent conductive layer and located above the color filter layer, wherein a height of the spacer and a thickness of the color filter layer in total are less than a height of the padding structure and a thickness of the light-shielding layer in total.

2. The color filter substrate as recited in claim 1, wherein the color filter layer comprises a plurality of color filter patterns, the color filter patterns are located in the pixel regions.

3. The color filter substrate as recited in claim 2, wherein the color filter patterns comprise at least one red filter pattern, at least one blue filter pattern and at least one green filter pattern.

4. The color filter substrate as recited in claim 2, wherein the padding structure is formed by stacking at least two of the color filter patterns.

5. The color filter substrate as recited in claim 1, wherein the thickness of the light-shielding layer is less than the thickness of the color filter layer.

6. The color filter substrate as recited in claim 1, wherein the height of the padding structure is greater than the height of the spacer.

7. The color filter substrate as recited in claim 1, wherein the passivation layer has the same thickness on the padding structure, the light-shielding layer, and the color filter layer.

8. The color filter substrate as recited in claim 1, wherein the transparent conductive layer has the same thickness on the passivation layer.

9. A display panel, comprising:
   a color filter substrate as claimed in claim 1;
   an active device array substrate having a pixel electrode layer, wherein the transparent conductive layer of the color filter substrate is connected to the pixel electrode layer of the active device array substrate via the padding structure; and
   a display medium located between the color filter substrate and the active device array substrate.

10. The display panel as recited in claim 9, wherein the display medium comprises a liquid crystal layer.

* * * * *